United States Patent
Boucaud et al.

(10) Patent No.: US 8,840,070 B2
(45) Date of Patent: Sep. 23, 2014

(54) POWER SUPPLY AND CONTROL DEVICE FOR ACTUATORS, CORRESPONDING ACUTATION ASSEMBLY, AND AIRCRAFT COMPRISING SUCH A DEVICE

(75) Inventors: Arnaud Boucaud, Paris (FR); Philippe Elie, Paris (FR); Alexandre Guyamier, Paris (FR); Van Lam Nguyen, Paris (FR); Pascal Nauroy, Paris (FR); Marc Pontrucher, Paris (FR); Jean-Francois Weibel, Paris (FR); David Wong, Paris (FR)

(73) Assignee: Sagem Defense Securite, Paris (FR)

( * ) Notice: Subject to any disclaimer, the term of this patent is extended or adjusted under 35 U.S.C. 154(b) by 141 days.

(21) Appl. No.: 13/703,341

(22) PCT Filed: Jun. 17, 2011

(86) PCT No.: PCT/EP2011/060156
§ 371 (c)(1),
(2), (4) Date: Dec. 10, 2012

(87) PCT Pub. No.: WO2011/157834
PCT Pub. Date: Dec. 22, 2011

(65) Prior Publication Data
US 2013/0082149 A1    Apr. 4, 2013

(30) Foreign Application Priority Data

Jun. 18, 2010 (FR) .................................. 10 54855

(51) Int. Cl.
   *B64C 13/50*      (2006.01)
   *B64C 25/24*      (2006.01)
   *B64C 13/04*      (2006.01)
   *H02J 4/00*       (2006.01)

(52) U.S. Cl.
   CPC . *H02J 4/00* (2013.01); *B64C 25/24* (2013.01); *B64C 13/04* (2013.01); *B64C 13/50* (2013.01); *B64D 2221/00* (2013.01)
   USPC ............................................ 244/228; 307/9.1

(58) Field of Classification Search
   None
   See application file for complete search history.

(56) References Cited

U.S. PATENT DOCUMENTS 5,612,579 A * 3/1997 Wisbey et al. .................. 307/18
7,454,938 B2 * 11/2008 Morel et al. .................... 72/148

(Continued)

FOREIGN PATENT DOCUMENTS

DE     10 2005 059423 A1    6/2007
EP           1 834 874 A1    9/2007
WO    WO 2007/068451 A1    6/2007

*Primary Examiner* — Christopher P Ellis
*Assistant Examiner* — Medhat Badawi
(74) *Attorney, Agent, or Firm* — Muncy, Geissler, Olds & Lowe, P.C.

(57) ABSTRACT

A power supply and control device for a plurality of electric actuators, the device comprising a control circuit and a power circuit, the power circuit having an inverter module connected to a switch module provided with connection means for connection to the actuators, the control circuit being connected to the switch module to operate it so as to connect the actuators sequentially to the inverter module, wherein the control circuit is arranged to control the inverter module and the switch module sequentially, and wherein the control circuit includes a monitoring module arranged to detect a malfunction of the device. An actuator assembly comprising a plurality of actuators and such a power supply and control device, and an aircraft including a plurality of actuators and such a power supply and control device of the above-specified type.

19 Claims, 2 Drawing Sheets

(56) References Cited

U.S. PATENT DOCUMENTS

| | | | |
|---|---|---|---|
| 7,600,715 B2 * | 10/2009 | Matsui | 244/99.6 |
| 7,786,615 B2 * | 8/2010 | Garcia | 307/41 |
| 7,851,943 B2 * | 12/2010 | Datta et al. | 307/38 |
| 7,872,367 B2 * | 1/2011 | Recksiek et al. | 307/9.1 |
| 7,923,857 B2 * | 4/2011 | Langlois et al. | 307/9.1 |
| 8,476,785 B2 * | 7/2013 | Yamashita et al. | 307/9.1 |
| 8,643,212 B2 * | 2/2014 | Yamashita | 307/9.1 |
| 2011/0198918 A1 * | 8/2011 | Langlois et al. | 307/9.1 |

* cited by examiner

POWER SUPPLY AND CONTROL DEVICE FOR ACTUATORS, CORRESPONDING ACUTATION ASSEMBLY, AND AIRCRAFT COMPRISING SUCH A DEVICE

FIELD OF THE INVENTION

The present invention relates to a power supply and control device for electric actuators, to an actuation assembly comprising such a device and electric actuators, and to an aircraft having electric actuators and such a device.

BACKGROUND OF THE INVENTION

An aircraft, such as an airplane, has a multitude of movable elements associated with actuators that are connected to a piloting unit enabling the pilot of the airplane to control the actuators directly or indirectly.

By way of example, the movable elements may be:
wing surfaces or flight surfaces, in particular ailerons, spoilers, and other flaps; and
landing gear elements, in particular hatches, undercarriage legs, or the nose wheel(s).

Conventionally, the actuators have been hydraulic actuators, and in particular actuators that are connected via solenoid valves to one or more hydraulic circuits under pressure. The use of hydraulic energy nevertheless raises problems of weight and maintenance constraints that are causing airplane manufacturers to minimize the dimensions of the hydraulic circuits as much as possible.

Proposals have therefore been made to associate each actuator with an individual hydraulic circuit that incorporates an electric pump. There are then no longer one or more hydraulic circuits of large size serving all of the actuators of the airplane, but rather a plurality of small-sized hydraulic circuits, each connected to a single actuator or to a very small number of actuators that need to be operated simultaneously. That architecture has greatly reduced constraints associated with using hydraulics on airplanes.

Nevertheless, historically the Air Transport Association (ATA) has defined a functional coding system for classifying the various systems and equipments present on an airplane depending on the functions they perform in an airplane. By extension, each of those classes is associated with constraints on design and on failure modes to be accommodated so that a piece of equipment that belongs to one particular ATA class is not considered as being usable in some other ATA class.

OBJECT AND SUMMARY OF THE INVENTION

An object of the invention is to further improve the architecture of means for actuating the movable elements of aircraft.

To this end, the invention provides a power supply and control device for a plurality of electric actuators, the device comprising a control circuit and a power circuit, the power circuit having an inverter module connected to a switch module provided with connection means for connection to the actuators, the control circuit being connected to the switch module to operate it so as to connect the actuators sequentially to the inverter module. The control circuit is arranged to control the inverter module and the switch module sequentially, and the control circuit includes a monitoring module arranged to detect a malfunction of the device.

The device makes it possible to power actuators that may be used in the same time period but not simultaneously, while ensuring a high level of safety in particular by limiting risks of fire associated with sparks being formed or with high levels of local heating, and by monitoring the operation of the device. By means of this architecture it is also easier to ensure that the device satisfies the constraints associated with a plurality of ATA categories.

Preferably, the switch module has at least one switch relay and the control circuit is arranged to allow the position of the switch relay to change only at zero voltage and current and, conversely, the control circuit is arranged to prevent the supply of power in the event of the switch relay being in a wrong position.

Advantageously, the monitoring module is arranged to inhibit the switch relay when the monitoring module has detected a failure.

In a particular embodiment, the control circuit is connected via a connection interface to sensors for sensing the voltage and the current of the inverter and via isolation means to a driver of the inverter module, and/or the control circuit is connected via a connection interface to sensors for sensing the position and the current of the switch module and via isolation means to at least one switch relay of the switch module.

The control circuit is thus protected relative to the power circuit.

The monitoring module is then preferably connected to the connection interfaces.

The information passing via these interfaces can then be used by the monitoring module which can also monitor proper operation of said interfaces.

Advantageously, the monitoring module is connected via isolation means to a circuit breaker of the inverter module in order to control said circuit breaker, and is also connected to the circuit breaker in order to verify an operating state.

Preferably, the monitoring module is arranged to perform at least one of the following tasks:
issue a warning to the outside in the event of a malfunction;
cause the power circuit to stop;
cause at least one safety component to be reinitialized after eliminating a cause of failure;
verify at least one regulation loop by comparing at least one setpoint issued by the control circuit and a state of the inverter module; and
verify the validity of measurements returned by at least one sensor.

The invention also provides an aircraft including a plurality of electric actuators, an electricity network for powering the actuators, and a piloting unit arranged to enable a pilot to control the actuators, the aircraft including at least one power supply and control device of the above-specified type connecting at least one group of actuators to the power supply network, the power supply and control device and having a power circuit controlled by a control circuit and connected to the piloting unit, the control circuit being arranged to cause power to be supplied sequentially to the actuators of the group of actuators.

Thus, using electric actuators makes it possible to eliminate the hydraulics over at least a portion of the aircraft. In addition, in the invention, a single power circuit powers a group of actuators, thereby making it possible to limit the weight of the on-board power components. Sequential powering makes it possible for the actuators to be powered at different instants with different amplitudes in such a manner that the actuators in any one group can be connected to movable elements that perform different functions.

Advantageously, the aircraft has a plurality of identical power supply and control devices each connected to a respective group of actuators.

The use of a plurality of identical power supply and control devices facilitates maintenance operations and the management of spare parts.

Also advantageously, the aircraft has two wings each provided with a plurality of actuators, and the aircraft has two power supply and control devices so that each of them controls the actuators associated with a respective one of the wings and, preferably, the actuators of each wing are connected to elements such as at least one movable wing surface and at least one landing gear element.

Since the power supply and control device is connected to actuators associated with elements that need to satisfy different ATA standards, the power supply and control device is arranged to satisfy all of the standards involved.

Finally, the invention provides an actuator assembly comprising a plurality of actuators and a power supply and control device of the above-specified type.

BRIEF DESCRIPTION OF THE DRAWINGS

Other characteristics and advantages of the invention appear on reading the following description of a particular, non-limiting embodiment of the invention.

Reference is made to the accompanying drawings, in which.

DETAILED DESCRIPTION OF THE INVENTION

Figure 1:
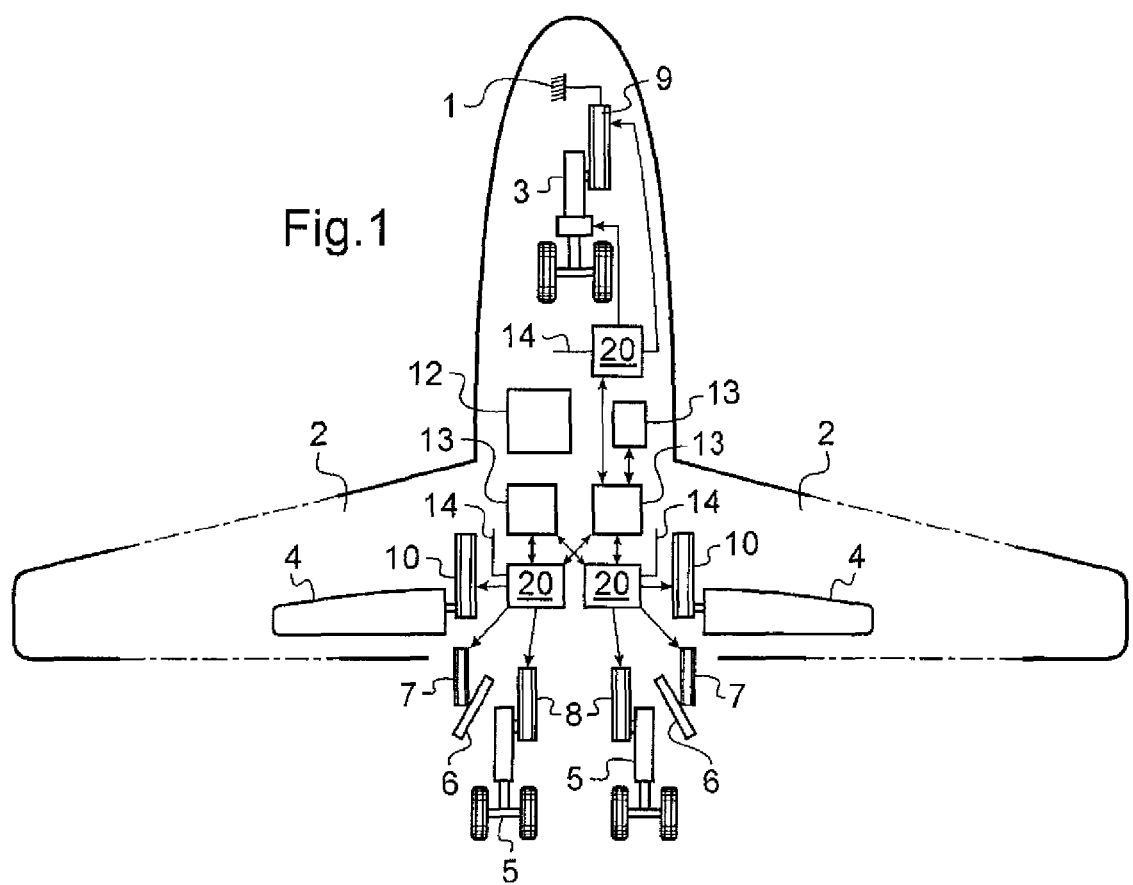
FIG. 1 is a diagrammatic plan view of an airplane in accordance with the invention.
Figure 2:
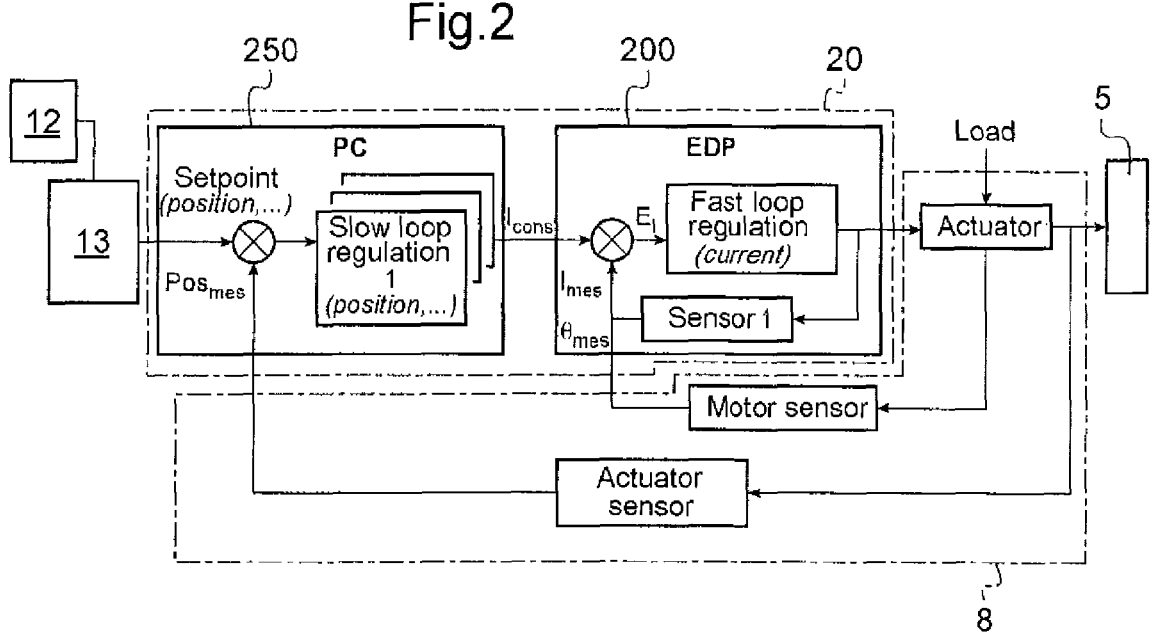
FIG. 2 is a simplified view of the power supply and control device of the invention.
Figure 3:
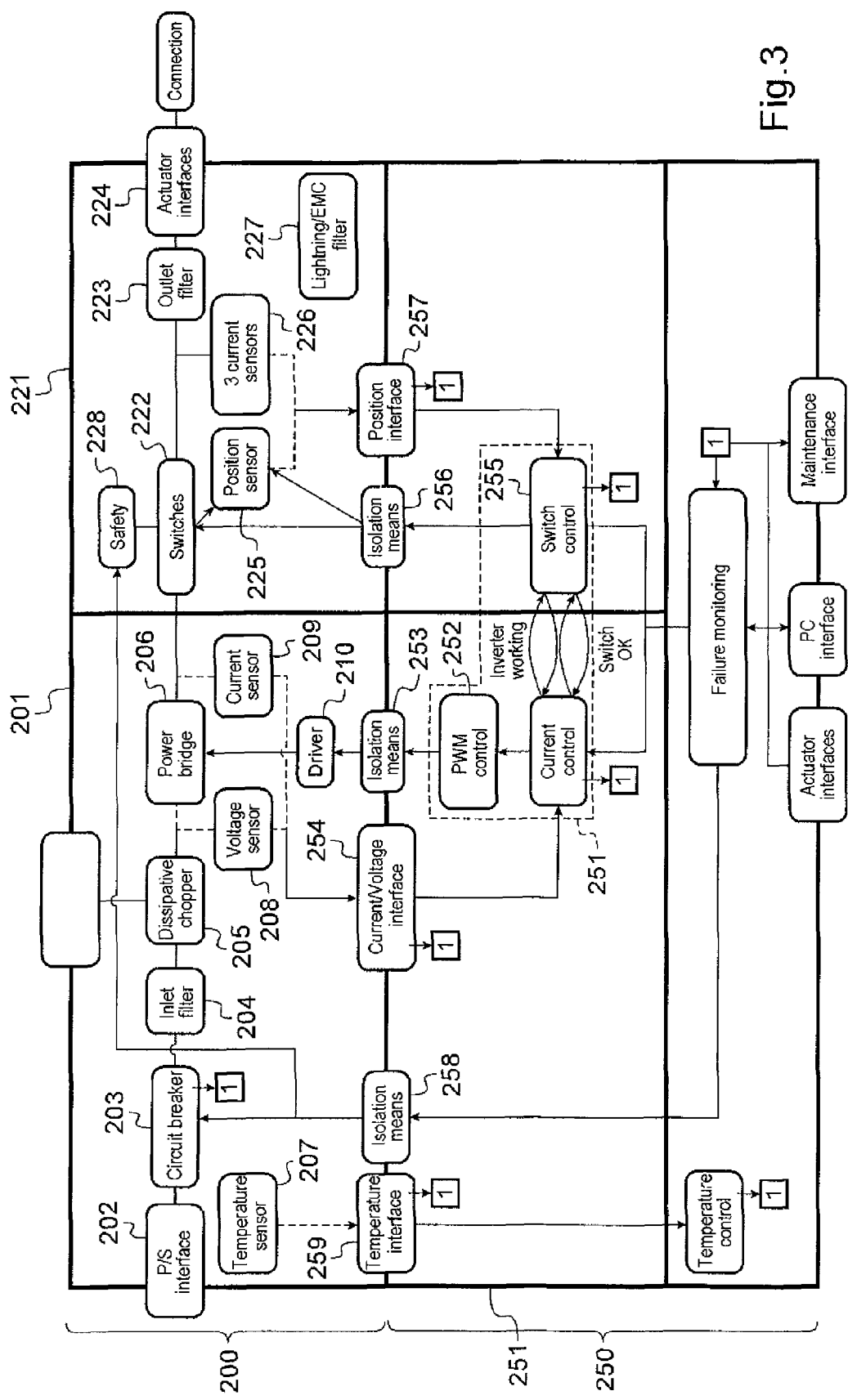
FIG. 3 is a block diagram view of the actuator assembly in accordance with the invention.

With reference to the figures, the invention is described in its application to an airplane having a fuselage referenced 1 and two wings referenced 2. The front portion of the fuselage 1 is provided with nose landing gear 3 retractable into a housing that is closed by a hatch. Each wing 2 is provided with at least one air spoiler flap 4 and landing gear 5 that is retractable into a housing that is closed by a hatch 6. The hatches 6, the landing gear 3, 5, and the spoiler flaps 4 form movable elements and they are associated with actuators 7, 8, 9, and 10 that extend between the structure of the airplane and the movable element in question in order to move said movable element. The nose landing gear 3 is also steerable by means of an actuator 11. The actuators 7 to 11 comprise permanent magnet synchronous motors and they include respective locking members and movement transmission means associated with position sensors. Each locking member is arranged to keep the actuator (or the moving elements if they are offset thereon) in position in the absence of the actuator being powered. The movement transmission means are arranged to transform the rotary movement of the motor into a linear movement or to amplify the rotary movement.

The actuators 7 to 11 are controlled by a piloting unit 12 having control instruments and control units 13 performing assistance and management functions (for the engines, for managing the landing gear, the autopilot, navigation, . . . ) so as to enable the pilot of the airplane to operate it. The control units 13 may for example be computers running dedicated computer programs or a single computer executing a plurality of dedicated computer programs.

The actuators 7 to 11 are connected in groups to an on-board electricity network, referenced 14, and to the piloting unit 12 via power supply and control devices 20. The on-board electricity network 14 comprises a high-power direct current (DC) subnetwork at a voltage of 270 V, and a low-power DC subnetwork at 28 V.

The aircraft includes in particular a power supply and control device 20 connected to an actuator 9 for actuating a nose landing gear leg 3 and a steering actuator 11 for steering a nose wheel.

The actuators 7, 8, and 10 of each wing 2 thus form respective groups and the actuators 9 and 11 associated with the nose landing gear likewise form a group.

Each power supply and control device 20 is thus connected to a plurality of actuators and is arranged to power them sequentially. The term "sequentially" is used to mean that the actuators are not powered simultaneously, but rather one after another depending on requirements.

Each power supply and control device 20 has a power circuit given overall reference 200 and a control circuit given overall reference 250. The components used in these circuits are themselves known.

The power supply circuit 200 comprises an inverter module 201 that is provided with connection means 202 connected to the network 14 and that is connected in series with a switch module 221 having connection means 224 to the actuators. The connection means 202 serve to connect the power supply and control device 20 to the high-power and low-power subnetworks of the network 14.

From the connecting means 202 to the connection means 224 the power circuit comprises: a circuit breaker 203; an inlet filter 204; a dissipative chopper 205; a power bridge 206; a switch relay 222; and an outlet filter 223. The circuit breaker 203 is arranged to cut off the high-power power supply in particular in the event of current being drawn outside the limits set by regulation or in the event of a short circuit, . . . . The inlet filter 204 is arranged to attenuate noise on the low-power and high-power power supplies and to smooth the load taken from the high-power power supply. The dissipative chopper 205 is arranged to connect a dissipative load (such as a resistance) when the high-power power supply voltage exceeds a predetermined threshold. The power bridge 206 is also connected to a driver 210 and is arranged to transform the high-power DC received as input into three-phase alternating current (AC). The outlet filter 223 matches the delivered three-phase power to the impedance of the assembly comprising the actuator and the connection to the device.

The inverter module 201 comprises, in addition to the components 202 to 206, a temperature sensor 207, a voltage sensor 208 upstream from the power bridge 206, and a current sensor 209 downstream from the power bridge 206.

In addition to the components 222 to 224, the switch module 221 also comprises: a position sensor 225 for sensing the position of the switch relay 222; a current sensor 226 downstream from the switch relay 222; a safety circuit 228 for the switch relay 222; and a filter 227 for providing protection against electromagnetic radiation and lightning (or more generally against any surge voltage or surge current of external origin). The safety circuit 228 is arranged to short circuit the phases of the actuator via damper resistances in order to limit the speed of the motor when it is not being driven or in the event of failure. The safety circuit is automatically activated when none of the actuators is being operated or selected or powered. It is also possible to provide the actuators with damping that is mechanical, and for example hydraulic or magnetic. The current sensor 226 is used to measure the instantaneous currents in the three phases of a motor. This measurement is useful for current control, short-circuit protection, limiting current consumption, and verifying the position of the switch relay 222.

The control circuit 250 is connected to the control units 13 and includes a control module 251 having a pulse width modulator unit 252 connected via isolation means 253 to the driver 210 in order to control it and via a connection interface 254 to the voltage and current sensors 208 and 209 in order to form a regulation loop. The pulse width modulator unit 252 is arranged to calculate the three-phase voltage that is to be delivered in order to satisfy the regulated current setpoint, and to calculate the corresponding control signal for the power bridge 206. The control module 251 also has a driver unit 255 connected via isolation means 256 to the switch relay 222 and via a connection interface 257 to the position and current sensors 225 and 226 in order to form a regulation loop.

Finally, the control unit 250 includes a monitoring unit 260 that is connected:
- firstly to the temperature sensor 207 (via a connection interface 259), to the connection interface 254, to the circuit breaker 203 (via the isolation means 258), to the pulse width modulator unit 252, to the driver unit 255, and to the connection interface 257 in order to receive information therefrom; and
- secondly to the circuit breaker 203 and to the safety circuit 228 (via the isolation means 258), to the pulse width modulator unit 252, and to the driver unit 255 for controlling them (activating, deactivating, reinitializing them) in the event of a malfunction endangering the safety of the installation or after eliminating a malfunction in order to put them back into service.

The monitoring module 260 serves to ensure proper operation of the power supply and control device 20 and issues a warning to the piloting unit 12 in the event of a malfunction (incorrect switching, overheating, short circuit, invalid control signals, . . . ). As mentioned above, in the event of a severe failure, the monitoring module 260 is arranged to cause the power circuit 200 to be stopped; the monitoring unit 260 may also cause safety components to be reinitialized after a cause of failure has been eliminated. The monitoring module 260 is also arranged to verify the regulation loops by comparing the setpoints issued by the control circuit 250 with the state of the inverter module 201 (e.g. obtained via the voltage and current sensors 208, 209), and also the validity of measurements returned by the sensors (e.g. by, comparing the signals from the position sensors 225 and from the current sensors 226 when switching it concerned). Finally, the monitoring module 260 is connected to a connection interface leading to a maintenance device 261 and to a connection interface leading to the actuators 262.

In nominal operation, the power supply and control device 20 is arranged to control the inverter module 201 and the switch module 221 sequentially. Simultaneous operation of the switch module 221 and the inverter 201 is not allowed and the power supply and control device 20 is arranged to authorize a change of position of the switch relay 222 only at zero voltage and current. The supply of power is also not allowed in the event of the switch relay 222 being in a wrong position.

The switch relay 222 is arranged to connect the actuator selected by the control circuit 250 to the inverter module 201, and to be inhibited by the monitoring module 260 when it has detected a failure.

The control module 251 sends a control order to the switch relay 222 in order to select the actuator and then sends current setpoints to the power circuit 200. The power circuit 200, and more particularly the driver 210, is arranged to determine the current servo-control relationship and to power the actuator as a function of the data received from the control module.

Each power supply and control device 20 thus acts as a chopper power supply (also known as a switch mode power supply SMPS) that is connected selectively to each of the actuators by the switch module 221. The power supply is regulated and servo-controlled by means of a slow loop and by means of a fast loop. The control circuit 250 performs slow-loop regulation (position servo-control) specific to each actuator as a function of information coming from the position sensor associated with the actuator, while the power circuit 200 performs fast-loop regulation (current servo-control) that is common to all of the actuators, as a function of information coming from the motor of the actuator itself and as a function of the current value transmitted by the current sensor 209. Preferably, in order to obtain maximum torque, regulation is performed in such a manner that the current that is delivered is in phase with the electromagnetic force of the motor (vector control).

An example of sequential operation is described below in greater detail with reference to actuating a spoiler 4 and one undercarriage 8 of the landing gear.

In nominal operation, when preparing to land, the spoiler 4 is extended and held in the extended position by the power supply and control device 20 which powers the actuator 8 by performing position servo-control. When the command to extend the undercarriage 8 reaches the power supply and control device 20, it begins a power supply sequence:
- the actuator 10 is caused to be locked internally;
- the actuator 7 is powered to open the hatch 6, and is then locked;
- the actuator 8 is powered to extend the undercarriage 8, and is then locked; and
- the actuator 10 is powered again in order to finish deploying the spoiler 4.

Since the undercarriage is extended at low speed, the risk of the actuator latch 10 having to withstand a load that might break it is low. Nevertheless, it is possible to associate a mechanical fuse with the latch, such as a rated friction brake.

It should be observed that if the actuator is to operate as a generator, i.e. if an external force drives movement of the movable element and rotation of the motor, then the dissipative chopper serves to dissipate the energy that is produced.

The maximum time allowed for switching the actuators in the above sequence is about 500 milliseconds (ms) and is preferably shorter. This time is determined so that in the event of the airplane descending rapidly as a result of a failure, typically at a speed of 5 meters per second (m/s), the switching takes place fast enough to enable the various movable elements to be operated to ensure that the airplane is ready for landing. Specifically, during switching, the aircraft will drop by 2.5 meters (m) in a time of 500 ms, which is acceptable.

Naturally, the invention is not limited to the embodiments described but covers any variant coming within the ambit of the invention as defined by the claims.

In particular, the power supply and control device may be of a structure that is different from that described, and for example it may include component redundancy for safety reasons.

Each power supply and control device 20 may be connected to other actuators. This is not described in detail in order to clarify and simplify the description. It should be understood that once the power supply and control devices 20 are connected to a plurality of actuators, the principle of operation is the same regardless of the number of actuators, which is of relatively little importance. A power supply and control device may thus possess the number of outlets required as a function of the number of actuators that are to be controlled. On a given aircraft, it is also possible to have power supply and control devices that have different numbers of outlets.

It should be observed that two actuators that need to be actuated simultaneously may be connected via a branch connection to a common line connected to the power supply and control device 20.

What is claimed is:

1. A power supply and control device for a plurality of electric actuators, the device comprising a control circuit and a power circuit, the power circuit having an inverter module connected to a switch module provided with connection means for connection to the actuators, the control circuit being connected to the switch module to operate it so as to connect the actuators sequentially to the inverter module, wherein the control circuit is arranged to control the inverter module and the switch module sequentially, and wherein the control circuit includes a monitoring module arranged to detect a malfunction of the device.

2. The device according to claim 1, wherein the switch module has at least one switch relay and the control circuit is arranged to allow the position of the switch relay to change only at zero voltage and current.

3. The device according to claim 1, wherein the control circuit is arranged to prevent the supply of power in the event of the switch relay being in a wrong position.

4. The device according to claim 1, wherein the monitoring module is arranged to inhibit the switch relay when the monitoring module has detected a failure.

5. The device according to claim 1, wherein the control circuit is connected via a connection interface to sensors for sensing the voltage and the current of the inverter and via isolation means to a driver of the inverter module.

6. The device according to claim 1, wherein the control circuit is connected via a connection interface to sensors for sensing the position and the current of the switch module and via isolation means to at least one switch relay of the switch module.

7. The device according to claim 1, wherein the control circuit is connected via a first connection interface to sensors for sensing the voltage and the current of the inverter and via isolation isolation means to a driver of the inverter module, wherein the control circuit is connected via a second connection interface to sensors for sensing the position and the current of the switch module and via second isolation means to at least one switch relay of the switch module, and wherein the monitoring module is connected to the first and second connection interfaces.

8. The device according to claim 1, wherein the monitoring module is connected via isolation means to a circuit breaker of the inverter module in order to control said circuit breaker, and is also connected to the circuit breaker in order to verify an operating state.

9. The device according to claim 1, wherein the monitoring module is arranged to perform at least one of the following tasks:

issue a warning to the outside in the event of a malfunction;
cause the power circuit to stop;
cause at least one safety component to be reinitialized after eliminating a cause of failure;
verify at least one regulation loop by comparing at least one setpoint issued by the control circuit and a state of the inverter module; and
verify the validity of measurements returned by at least one sensor.

10. The device according to claim 1, wherein the monitoring module is connected to a connection interface leading to a maintenance device and to a connection interface leading to the actuators.

11. The device according to claim 1, wherein the control circuit includes a chopper module connected to the inverter module.

12. The actuator assembly comprising a plurality of actuators and a power and control device according to claim 1.

13. The assembly according to claim 12, wherein at least one of the actuators is a permanent magnet synchronous motor.

14. An aircraft including a plurality of electric actuators, an electricity network for powering the actuators, and a piloting unit arranged to enable a pilot to control the actuators, wherein the aircraft includes at least one power supply and control device connecting at least one group of actuators to the power supply network, the power supply and control device being in accordance with claim 1 and having a power circuit controlled by a control circuit and connected to the piloting unit, the control circuit being arranged to cause power to be supplied sequentially to the actuators of the group of actuators.

15. The aircraft according to claim 14, having a plurality of identical power supply and control devices (20) each connected to a respective group of actuators (7, 8, 9, 10, 11,).

16. The aircraft according to claim 15, wherein the aircraft has two wings, each provided with a plurality of actuators, and the aircraft has two power supply and control devices so that each of them controls the actuators associated with a respective one of the wings.

17. An aircraft according to claim 16, wherein the actuators of each wing are connected to elements such as at least one movable wing surface and at least one landing gear element.

18. The aircraft according to claim 17, wherein the movable wing surfaces are taken from a group comprising flaps and spoilers, and the landing gear element is taken from a group comprising an undercarriage hatch and an undercarriage leg.

19. The aircraft according to claim 16, including a power supply and control device connected to an actuator for actuating a nose landing gear leg and to an actuator for steering a nose wheel.

* * * * *